(12) United States Patent
Montagna et al.

(10) Patent No.: US 8,883,661 B2
(45) Date of Patent: Nov. 11, 2014

(54) COMPOSITE MATERIAL FOR BALLISTIC PROTECTION AND RELATIVE METHOD OF PREPARATION

(75) Inventors: Adalberto Lorenzo Montagna, Milan (IT); Mauro Vernocchi, Carugo (IT)

(73) Assignee: Pro-Systems S.p.A., Milan (IT)

( * ) Notice: Subject to any disclaimer, the term of this patent is extended or adjusted under 35 U.S.C. 154(b) by 353 days.

(21) Appl. No.: 13/300,185

(22) Filed: Nov. 18, 2011

(65) Prior Publication Data

US 2013/0125742 A1    May 23, 2013

(51) Int. Cl.
*B32B 5/18* (2006.01)
*B32B 5/26* (2006.01)
*F41H 5/04* (2006.01)
*D04H 3/004* (2012.01)
*D04H 3/002* (2012.01)
*D04H 3/005* (2012.01)

(52) U.S. Cl.
CPC ............... *F41H 5/0471* (2013.01); *B32B 5/26* (2013.01); *B32B 2266/0242* (2013.01); *B32B 2571/00* (2013.01); *B32B 2262/0269* (2013.01); *B32B 2262/0253* (2013.01); *D04H 3/004* (2013.01); *B32B 2266/0278* (2013.01); *D04H 3/002* (2013.01); *B32B 2255/02* (2013.01); *D04H 3/005* (2013.01); *B32B 2571/02* (2013.01); *Y10S 428/911* (2013.01)
USPC ........... 442/221; 442/134; 442/135; 428/911; 2/2.5

(58) Field of Classification Search
CPC ......... F41H 5/04; F41H 5/0471; D04H 13/00; D04H 3/002; D04H 3/004; D04H 3/005; B32B 5/18; B32B 5/26; B32B 2571/02; B32B 2255/02; B32B 2262/0269; B32B 2262/0253; B32B 2571/00; B32B 2266/0278; B32B 2266/0242
USPC ................. 442/134, 135, 221, 224; 428/911, 428/304.4; 2/2.5
See application file for complete search history.

(56) References Cited

U.S. PATENT DOCUMENTS

| | | |
|---|---|---|
| 2005/0090174 A1 | 4/2005 | Peruzzo |
| 2006/0211318 A1 | 9/2006 | Fenzi |
| 2007/0172594 A1 | 7/2007 | Sauer et al. |
| 2007/0196587 A1 | 8/2007 | Peruzzo |
| 2008/0268733 A1 | 10/2008 | Pritchard et al. |
| 2012/0186433 A1 * | 7/2012 | Braiewa et al. ............... 89/36.02 |

FOREIGN PATENT DOCUMENTS

| | | |
|---|---|---|
| EP | 1 526 215 A2 | 4/2005 |
| EP | 1 526 215 A3 | 4/2005 |
| WO | WO 2004/089143 A2 | 10/2004 |
| WO | WO 2004/089143 A3 | 10/2004 |
| WO | WO 2008/116303 A1 | 10/2008 |

* cited by examiner

*Primary Examiner* — Arti Singh-Pandey
(74) *Attorney, Agent, or Firm* — Oblon, Spivak, McClelland, Maier & Neustadt, L.L.P.

(57) ABSTRACT

The present invention regards a composite material for ballistic protection comprising a ballistic fabric substrate having at least one surface provided with a polymer coating obtainable through foaming and subsequent polymerization of a mixture comprising an acrylic resin and a polyurethane resin. The present invention further regards the method for preparing such composite material, as well as a laminated multilayer system, a packet for ballistic protection and an article for ballistic protection comprising such composite material.

20 Claims, No Drawings

COMPOSITE MATERIAL FOR BALLISTIC PROTECTION AND RELATIVE METHOD OF PREPARATION

The present invention refers to a composite material for ballistic protection and the relative method of preparation.

The present invention originates in the sector of materials used for the production of articles for ballistic protection.

The articles for ballistic protection known in the state of the art are generally constituted by a plurality of overlapped layers of textile substrates (fabrics for ballistic protection), such as fabrics made of aramid fibres, polyethylene or other synthetic fibres. The entirety of these overlapped layers forms a packet for ballistic protection.

In the packet for ballistic protection, the fabric layers can be held together in various ways: for example, through stitches between the overlapped layers; through lamination (coupling) with the polymer film (for example, polyethylene film), through hot pressing; through impregnating layers with a bonding resin, generally an epoxy or phenolic resin.

The number of layers that a packet for ballistic protection is made up of varies depending on the type of fibre and fabric used, the degree of protection and rigidity that is desired to be obtained and the end use thereof. The packets for ballistic protection used for manufacturing bullet-proof vests, for example, are generally made up of 10 to 40 layers, depending on the type of fibre and fabric used, the degree of protection and the required ballistic/weight resistance ratio.

The packets for ballistic protection known in the state of the art reveal various disadvantages. The presence of stitches, for example, makes the packet rigid and, thus, uncomfortable for the wearer, though it increases the properties of resistance thereof against deformation due to impact (trauma); furthermore, the presence of stitches increases the manufacturing costs of the packet itself.

A second disadvantage lies in the fact that, in order to obtain the desired performance, in the packets for ballistic protection known in the state of the art there is often require the use of various types of materials (at least 2 or 3 different types). This particularly complicates the method of preparing these packets.

A further disadvantage lies in the fact that attaining the levels of reduction or limitation of the "trauma" defined by the sector standards often requires adding reinforcement layers constituted by rigid materials (so-called "anti-trauma" materials) which stiffen the packet for ballistic protection, hence making it uncomfortable for the wearer.

Furthermore, some materials used as textile substrates, such as for example the substrates constituted by unidirectional materials (an entirety of yarns and reinforcement polymer film) cannot be subjected to the usual finishing treatments for conferring to the end product oil and water repellent characteristics; furthermore, the performance of these materials under critical conditions, such as for example if subjected to high temperatures, at times drop considerably.

Regardless of the type of application they are intended for, an important structural requirement of the articles for ballistic protection is that of having to offer the most advantageous ratio possible between the characteristics of ballistic resistance, i.e. resistance to the penetration of bodies such as bullets, shrapnel, blades, etc, and the overall weight of the article. This characteristic is particularly relevant in the case of the articles for ballistic protection intended to be worn, for example by the military or police personnel, where there is required an efficient protection and simultaneously maximum comfort and freedom of movement.

Though the articles for ballistic protection currently available in the state of the art have a ballistic resistance/weight ratio deemed acceptable, in this sector of the art there arises the need to define new materials that can be used for preparing articles having a more advantageous ballistic resistance/weight ratio and, in the case of articles to be worn, even more comfortable to wear.

Analogously, in the state of the art considerable efforts have been also made to research methods for producing these materials that are more simple, quick and inexpensive with respect to the methods known and used in the art.

An object of the present invention is to overcome the drawbacks outlined in the prior art.

A first object of the present invention is a composite material for ballistic protection comprising a ballistic fabric substrate having at least one surface provided with a layer of polymer coating constituted by a foam comprising an acrylic resin and a polyurethane resin, said polymer coating being applied on said surface at an amount ranging between 1-30 g of dry polymerised resin per square meter of substrate surface, preferably ranging between 2-15 g/m$^2$, more preferably ranging between 2-10 g/m$^2$.

A second object of the present invention is a laminated multilayer system comprising two or more layers of the aforementioned composite material between which a layer of bonding material is interposed.

A third object of the present invention is a packet for ballistic protection comprising a plurality of overlapped elements, each element being a layer of composite material or a laminated multilayer system.

A further object of the present invention is a method for preparing the aforementioned composite material for ballistic protection comprising the following steps:

a) applying—through foaming—on at least one surface of a ballistic fabric substrate a mixture comprising an acrylic resin and a polyurethane resin, said mixture being applied on said surface at an amount ranging between 1-30 g of dry polymerised resin per square meter of surface, preferably ranging between 2-15 g/m$^2$, more preferably ranging between 2-10 g/m$^2$;

b) subjecting said composition to a polymerisation treatment and forming on said surface a layer of polymer coating.

A further object of the present invention is an article for ballistic protection comprising the aforementioned composite material.

The Applicant has surprisingly discovered that applying on a ballistic fabric substrate a mixture comprising an acrylic resin and a polyurethane resin, through foaming technique, it is possible to produce a composite material characterised by a greater ballistic resistance/weight ratio with respect to the ballistic materials known in the state of the art. Due to such improved ballistic resistance/weight ratio, the composite material can be advantageously used for producing packets for ballistic protection having the same ballistic resistance as the currently known packets, but with an overall weight up to 15% lower and using up to 20% less than the textile substrate.

Furthermore, the packets for ballistic protection that can be obtained using the composite material subject of the present invention neither require stiffening stitches to reduce the impact trauma nor the insertion of anti-trauma elements and thus they optimally exploit the ballistic resistance characteristics of the textile substrate used. Hence, the articles for ballistic protection intended to be worn (for example vests) are lighter and more comfortable.

The composite material of the present invention is substantially constituted by a ballistic fabric substrate which has, on at least one surface, a coating based on a polymeric matrix.

The ballistic fabrics that can be used as substrate include fabrics comprising the fibres generally used for making products provided with resistance against the penetration by external bodies such as bullets, shrapnel, cutting blades, screwdrivers, bayonets and any other generally sharp or pointed object.

Examples of fibres that can be used within the invention include polyvinyl alcohol, polyacrylonitrile, polybenzobisoxazole fibres, polyolefin, polyimide, polyaramid, polyamide fibres, carbon or glass fibres or mixtures of the aforementioned fibres.

Preferred ballistic fibres among those listed above include aromatic polyamide fibres (aramid fibres and para-aramid fibres), polyethylene fibres, polybenzobisoxazole fibres and mixtures thereof. Substrates made up of fabrics of para-aramid fibres known under the commercial names of Kevlar®, Twaron®, Artec® ed Heracron® are particularly preferred.

The ballistic fabrics used are generally obtained starting from yarns having a count ranging between 200-3400 dtex, preferably ranging between 300-1700 dtex.

The substrate can be of the weft/warp fabric, a unidirectional fabric or multidirectional type. The substrate can also be made up of a non-woven fabric (NWF).

The polymer coating of the composite material is constituted by a thin layer of polymerized foam obtained by polymerizing a mixture of at least one polyurethane resin and an acrylic resin on the substrate surface.

The foam layer is continuous and homogeneous, i.e. the foam layer, at the end of the polymerisation, has a thickness substantially uniform over the entire substrate surface on which it is applied.

The coating is applied at least on one portion of surface of at least one face of the substrate. Preferably, the coating is applied over the entire substrate surface and, even more preferably, on both faces.

Typically, the thickness of the coating, at the end of the polymerisation, ranges between 3-35 micrometers, preferably between 5 and 15 micrometers.

An essential characteristic of the composite material and the relative method of preparation subject of the present invention lies in the fact that the polymer coating is applied to the substrate through the foaming method. Actually, it was surprisingly discovered that the use of this method, widely known and used in the fabric finishing sector, combined with a particular mixture of polymer resins obtains the unexpected advantage of allowing the application—to the substrate—sufficient to increase the ballistic resistance of the fabric but without excessively increasing the overall weight of the composite material.

Though no reference is made herein to any particular theory, it should be observed that this unexpected effect is due to, obviously besides the particular composition of the mixture of polymer resins, also to the fact that, contrary to what occurs in the application of resinous matrices by impregnation, the deposited resin penetrates only partly in the interstices between the fibres of the textile substrate. However, the partial penetration is sufficient to make the resin adhere to the fibres and, following the polymerisation, create—on the substrate surface—a reinforcement film (coating) which increases the characteristics of controlled deformation in all directions of the ballistic fabric substrate.

The amount of polymer coating applied on one face of the ballistic fabric substrate varies ranging between 1-30 g of dry polymerised resin per square meter of substrate surface, preferably ranging between 2-15 $g/m^2$, more preferably ranging between 2-10 $g/m^2$.

As mentioned, the composition used for obtaining the coating of the composite material is a mixture which comprises at least one polyurethane resin and an acrylic resin.

The "polyurethane resin:acrylic resin" weight ratio (referred to the weight of dry resins) in the mixture ranges between 1:20 and 1:1, preferably between 1:10 and 1:3.

The composition is prepared using the resins in form of aqueous dispersions (generally containing only traces of organic solvents). Typically, the aqueous dispersions have a dry resin content ranging between 40-60%, preferably 45-55%. Such aqueous dispersions are available in the market.

The use of aqueous-based polymerisable compositions considerably reduces the overall environmental impact associated to obtaining articles for ballistic protection according to the present invention.

The composition may also include additives, such as colouring agents, stabilizing agents, foaming agents, catalysts, at amounts ranging between 5 and 15% in weight with respect to the weight of the composition.

Typically, the composition is applied to the textile substrate in form of a polymerizable foam with density ranging between 100-220 $g/dm^3$, preferably ranging between 160-200 $g/dm^3$.

The techniques and equipment known in the state of the art of the textile industry and the fabrics finishing treatment can be used for preparing the composite material subject of the present invention.

The method for preparing the composite material comprises a step for applying—through foaming—the previously described polymerisable composition on at least one portion of a face of the textile substrate, preferably on both faces of the fabric.

The foam can be applied on the textile substrate through the techniques known in the art. Preferably the foaming is obtained by spreading using an air or thickness blade.

The textile substrate on which the coating is applied is generally machined in form of a web and gathered in reels.

The step of applying the composition is followed by a polymerisation step for transforming the polymeric foam into the polymerized coating. Polymerisation may be obtained by heating the substrate on which the composition was applied. Typically, the heating treatment is carried out at a temperature ranging between 130° C. and 210° C. for a period of time ranging between 1 and 3 minutes.

The polymerization step may be carried out in a "stenter" ("rameuse") apparatus, of the type known in the state of the art.

At the end of the polymerisation, the obtained composite material is cooled and wound again in the reels.

The composite material is also subjected to finishing treatments using compositions adapted to confer water- and oil-repellent properties to the surface of the coating (for example, fluorocarbon resin), using the processes of the type known in the state of the art.

In a preferred embodiment of the present invention, two or more layers of the composite material described above can be coupled together to form a multilayer system.

In the multilayer system the layers of composite material are laminated one to the other with the interposition of a layer of bonding material, such as for example a thermoplastic film, preferably polyethylene or polyurethane, or any other material of the type generally used in the sector of preparing materials for ballistic protection.

The preparation of the laminated multilayer material provides for the application of the bonding material on one of the two surfaces of a first composite material; a layer of a second composite material is then hot-laminated on the same surface. The first and the second layer can be constituted by the same or different composite materials according to the present invention. In particular, the laminated multilayer system may comprise layers of textile substrate of the same type of material (type of fibres, grammage, etc.) or different types. The layers can be laminated on each other according to the arrangement most advantageous to obtain the desired performance for the final ballistic protection article.

The bonding material may also be distributed on the substrate surface in form of powder or granules to be subsequently transformed into polymeric film through heating, during the lamination of the second layer of composite material.

The bonding material is typically applied at amounts ranging between 5-25% in weight (in dry state) referred to the weight of the ballistic fabric substrate, preferably ranging between 8-20% in weight.

The lamination of two or more layers of composite material can be obtained through hot calendering (at the temperature of 110-220° C.)

The overall properties of the laminated multilayer system subject of the present invention strictly depend, among the other parameters, on the number and the type of overlapped layers.

Preferably, the laminated multilayer system subject of the present invention is constituted by 2 to 4 layers of composite material, more preferably by 2 layers.

In order to produce a multilayer system comprising more than two layers of composite material, the steps of applying the bonding and lamination substance described above are repeated sequentially, by interposing a layer of bonding substance between the facing surfaces of the two layers of composite material intended to be coupled.

The methods for preparing the composite material and the multilayer system subject of the present invention can be obtained continuously. The obtained products are then conveniently wound in reels and sold in this form.

The composite material and the laminated multilayer system subject of the present invention have the advantage that they can be used as semi-finished products, i.e. as initial materials for the production of articles for more complex ballistic protection, reducing the production of processing waste. Contrary to the rigid materials known in the state of the art, which can be solely produced in form of panels of predefined dimensions as obtained through pressing, the composite material and the laminated multilayer system in form of a web, in fact, can be cut whenever required to the dimensions most suitable to obtain the final article.

The advantageous ballistic resistance/weight ratio characterising the composite material and the laminated multilayer system described above makes these materials particularly suitable for preparing packets for ballistic protection.

A packet for ballistic protection according to the present invention comprises a plurality of overlapped elements, where each element, regardless of the others, may be a layer of composite material or a layer of laminated multilayer system. The packet may also comprise a stitched or thermo-sealed coating casing which encloses the various elements. Typically, the casing is made of polyamide.

Varying the number and the type of the aforementioned elements allows composing packets for ballistic protection having the desired shape and thickness, as a function of the degree of protection intended to be conferred to the final article for ballistic protection.

Preferably, the packet for ballistic protection comprises a number of elements (composite material and/or multilayer system) such to have an overall number of layers of ballistic fabric substrate ranging between 8 and 40 depending on the type of the textile substrate used and the required degree of protection.

The high ballistic resistance that distinguishes the composite material and the laminated multilayer system subject of the present invention allows preparing packets for ballistic protection having the desired performance, without requiring using stitches as instead occurs in the state of the art. The packets for ballistic protection are thus more flexible and, hence, make the relative articles for ballistic protection containing them more comfortable to wear.

The composite material, the laminated multilayer system and the packets for ballistic protection subject of the present invention can be advantageously used for producing ballistic articles, such as for example bullet-proof vests, knife-proof vests, multi-protection vests, panels and sheets for rigid protections and armouring means and buildings, helmets, bomb-proof suits and covers, anti-trauma protections.

The following implementation examples are provided solely by way of illustration of the present invention and they shall not be deemed restrictive with respect to the scope of protection defined by the attached claims.

EXAMPLE 1

Coating Composition

A coating composition was prepared by mixing an aqueous dispersion of an acrylic resin (Dicrylan® AS type, 45% dry content) and an aqueous dispersion of a polyurethane resin (Dicrylan® PHR type, 50% dry content) in a "polyurethane dispersion:acrylic dispersion" weight ratio equivalent to 1:4; such ratio corresponds to a polyurethane resin:acrylic resin weight ratio equivalent to 1:3.6. Stabilising and foaming additives and catalysts were added to such mixture at overall amounts equivalent to 13% in weight with respect to the total weight of the composition.

EXAMPLE 2

Composite Material

The composition described in Example 1 was applied in form of foam (180 g/dm$^3$ density during application) by spreading using an air blade, on one face of a textile substrate constituted by a balanced fabric with plain weave (10.5 yarns/cm and 10.5 wefts/cm of Twaron® 930 dtex para-aramid fibre type 2040) weighing 200 g/m$^2$.

The textile substrate with the surface covered by the composition was subjected to heating in a stenter ("rameuse") apparatus at the temperature of 180° C. for seconds, up to the complete polymerization of the foam layer. The amount of dry polymerized composition applied amounted to 5 g/m$^2$.

The application of the composition and the subsequent polymerisation were repeated, at the same conditions, on the second face of the substrate.

The final weight of the composite material comprising the coating on both faces amounted to 210 g/m$^2$; the thickness thereof amounted to 0.35 mm.

EXAMPLE 2A

Composite Material

The composition described in Example 1 was applied in form of foam (180 g/dm$^3$ density during application) by spreading using an air blade, on one face of a textile substrate constituted by a balanced fabric with plain weave (11.7 yarns/cm and 11.7 wefts/cm of Twaron® 930 dtex para-aramid fibre type 2040) weighing 220 g/m$^2$.

The textile substrate with the surface covered by the composition was subjected to heating in a stenter ("rameuse") apparatus at the temperature of 180° C. for 90 seconds, up to complete polymerization of the foam layer. The amount of dry polymerized composition applied amounted to 5 g/m$^2$.

The application of the composition and the subsequent polymerisation were repeated, at the same conditions, on the second face of the substrate. The final weight of the composite material comprising the coating on both faces amounted to 230 g/m$^2$; the thickness thereof amounted to 0.35 mm.

EXAMPLE 3

Laminated Multilayer System

A laminated multilayer system according to the present invention was prepared by hot-laminating 2 layers of the composite material of Example 2. Lamination was conducted in a calender at the temperature of 200° C., interposing a 30 micrometer-thick polyethylene film between the faces of the composite material to be coupled.

The final weight of the multilayer system amounted to 445 g/m$^2$; the thickness thereof amounted to 0.60 mm.

EXAMPLE 4

Packet for Ballistic Protection

A laminated packet for ballistic protection according to the present invention was prepared using 27 layers of Example 2.

The final weight of the packet weighed 5.67 kg/m$^2$.

Experimental tests revealed that the aforementioned packet for ballistic protection guarantees a level III-A protection according to the NIJ 0101.04 standard.

A packet for ballistic protection constituted by elements made of the same textile substrate used for preparing the composite material of Example 2, whose elements were held together using stitches, was prepared for comparison purposes.

In order to obtain the same degree of protection the reference packet for ballistic protection required the use of 32 layers of textile substrate.

The overall weight of the reference packet amounted to 6.40 kg/m$^2$.

From the comparison with the reference packet for ballistic protection it is observed that, considering the same protection level (NIJ 0101.04 level III-A), the packet of the present invention weighs about 11.5% less than the reference weight and uses about 15.5% less of textile substrate. Furthermore, the lower number of layers of textile substrate used and the absence of stitches makes the packet for ballistic protection of the present invention less rigid than the reference one and simplifies manufacture thereof.

EXAMPLE 4A

Packet for Ballistic Protection

A laminated packet for ballistic protection according to the present invention was prepared using 19 layers of the composite material of Example 2A.

The final weight of the packet amounted to 4.37 kg/m$^2$.

Experimental tests revealed that the aforementioned packet for ballistic protection guarantees a level II protection according to the NIJ 0101.06 standard.

A packet for ballistic protection constituted by a series of layers of a balanced fabric with plain weave (10.5 yarns/cm and 10.5 wefts/cm of Twaron® 930 dtex para-aramid fibre type 2040) weighing 200 g/m$^2$, whose elements were held together using stitches, was prepared for comparison purposes.

In order to obtain the same protection level the reference packet for ballistic protection required the use of 24 layers of textile substrate.

The overall weight of the reference packet amounted to 4.80 kg/m$^2$.

From the comparison with the reference packet for ballistic protection it is observed that, considering the same protection level (NIJ 0101.06 level II), the packet of the present invention weighs about 9% less than the reference weight and uses about 13% less of textile substrate. Furthermore, the lower number of layers of textile substrate used (−21%) and the absence of stitches makes the packet for ballistic protection of the present invention less rigid than the reference one and simplifies manufacture thereof.

EXAMPLE 5

Packet for Ballistic Protection

A laminated packet for ballistic protection according to the present invention was prepared using 13 elements of the laminated multilayer system of Example 3, for a total of 26 layers of textile substrate.

The final weight of the packet amounted to 5.78 kg/m$^2$.

Experimental tests revealed that the aforementioned packet for ballistic protection guarantees a protection level III-A according to the standard NIJ 0101.04 standard.

From the comparison with the reference packet for ballistic protection described in Example 4, it is observed that, considering the same protection level (NIJ 0101.04 level III-A), the packet of the present invention weighs about 10% less than the reference one and uses 19% less of textile substrate. Furthermore, the lower number of layers used simplifies the manufacturing of the packet for ballistic protection subject of the present invention.

The invention claimed is:

1. A composite material, comprising:
   a ballistic fabric substrate comprising at least one surface comprising a layer of polymer coating comprising a foam comprising an acrylic resin and a polyurethane resin,
   wherein polymer coating is applied on the surface in an amount ranging between 1-30 g of dry polymerized resin per square meter of substrate surface.

2. The composite material of claim 1, wherein the polymer coating is applied on one or both faces of the fabric substrate.

3. The composite material of claim 1, wherein a weight ratio, polyurethane resin:acrylic resin, by weight of dry resins, in the foam ranges between 1:20 and 1:1.

4. The composite material of claim 1, wherein the ballistic fabric substrate comprises at least one fiber comprising at least one material selected from the group consisting of a polyvinyl alcohol, a polyacrylonitrile, a polybenzobisoxazole, a polyolefin, a polyimide, a polyaramide, a polyamide, carbon, a glass.

5. The composite material of claim 1, wherein the substrate comprises at least one selected from the group consisting of a unidirectional fabric, a multidirectional fabric, and a non-woven fabric.

6. A laminated multilayer system, comprising:
   two or more layers of the composite material of claim 1; and
   a layer of bonding material,
   wherein the bonding material is interposed between the layers of the composite material.

7. The system of claim 6, comprising 2 to 4 layers of the composite material.

8. An article, comprising:
   the multilayer system of claim 7.

9. A multilayer packet, comprising:
   a plurality of overlapped elements,
   wherein each element comprises a layer of the composite material of claim 1
   or
   a laminated multilayer system comprising:
   two or more layers of the composite material; and
   a layer of bonding material,
   wherein the bonding material is interposed between the layers of the composite material.

10. An article, comprising:
    the packet of claim 9.

11. An article, comprising:
    the laminated composite material of claim 1.

12. The material of claim 1, wherein the polymer coating is applied on the surface in an amount ranging between 2-15 g of dry polymerized resin per square meter of substrate surface.

13. The material of claim 1, wherein the polymer coating is applied on the surface in an amount ranging between 2-10 g of dry polymerized resin per square meter of substrate surface.

14. The material of claim 1, wherein a weight ratio, polyurethane resin:acrylic resin, by weight of dry resins, in the foam ranges between 1:10 and 1:3.

15. The material of claim 1, the ballistic fabric substrate comprises at least one fiber comprising at least one material selected from the group consisting of aramide, para-aramide, and polyethylene.

16. The material of claim 1, wherein the ballistic fabric substrate comprises an aramide fibre, a para-aramid fibre, and a polyethylene fibre.

17. A method for preparing the composite material of claim 1, the method comprising:
    (a) applying, through foaming, on at least one surface of a ballistic fabric substrate, a mixture comprising an acrylic resin and a polyurethane resin,
    wherein the mixture is applied on the surface in an amount ranging between 1-30 g of dry polymerized resin per square meter of surface;
    b) subjecting the composition to a polymerization treatment and forming on the surface a layer of polymer coating.

18. The method of claim 17, wherein a weight ratio, polyurethane resin:acrylic resin, by weight of dry resins, in the mixture ranges between 1:20 and 1:1.

19. The method of claim 17, wherein the polymerization treatment is carried out by heating at a temperature ranging between 130° C. and 210° C. for a period of time ranging between 1 and 3 minutes.

20. The method of claim 17, wherein, during the applying (a), the mixture has a density ranging between 100-220 g/dm$^3$.

* * * * *